United States Patent
Korobkin et al.

(10) Patent No.: US 10,699,663 B2
(45) Date of Patent: Jun. 30, 2020

(54) PROVIDING AN IMAGE WITH A SCALER CHIP IN DIRECT COMMUNICATION WITH AN EYE TRACKING DEVICE

(71) Applicant: Tobii AB, Danderyd (SE)

(72) Inventors: Carl Korobkin, Danderyd (SE); Ajinkya Waghulde, Danderyd (SE)

(73) Assignee: Tobii AB, Pittsburgh, PA (US)

( * ) Notice: Subject to any disclaimer, the term of this patent is extended or adjusted under 35 U.S.C. 154(b) by 0 days.

(21) Appl. No.: 15/906,936

(22) Filed: Feb. 27, 2018

(65) Prior Publication Data

US 2019/0266975 A1    Aug. 29, 2019

(51) Int. Cl.
| G09G 5/00 | (2006.01) |
| G06F 3/01 | (2006.01) |
| G09G 3/00 | (2006.01) |
| G02B 27/00 | (2006.01) |

(52) U.S. Cl.
CPC ......... *G09G 5/005* (2013.01); *G02B 27/0093* (2013.01); *G06F 3/013* (2013.01); *G09G 3/003* (2013.01); *G09G 2354/00* (2013.01)

(58) Field of Classification Search
CPC .... G09G 5/005; G09G 3/003; G09G 2354/00; G02B 27/0093; G06F 3/013
See application file for complete search history.

(56) References Cited

U.S. PATENT DOCUMENTS

| 7,068,813 | B2 * | 6/2006 | Lin ........................ G06F 3/013 351/209 |
| 8,462,949 | B2 | 6/2013 | Anderson et al. |
| 9,536,097 | B2 | 1/2017 | Anderson et al. |
| 9,830,513 | B2 | 11/2017 | Gustafsson et al. |
| 2004/0227699 | A1 * | 11/2004 | Mitchell ............... A61B 3/113 345/44 |
| 2011/0085139 | A1 * | 4/2011 | Blixt ..................... A61B 3/113 351/209 |
| 2015/0049004 | A1 * | 2/2015 | Deering ............. G02B 27/0172 345/8 |
| 2016/0070344 | A1 * | 3/2016 | Gohl ...................... G06F 3/013 345/156 |
| 2017/0090563 | A1 | 3/2017 | Gustafsson et al. |
| 2017/0090564 | A1 | 3/2017 | Gustafsson et al. |
| 2017/0091549 | A1 | 3/2017 | Gustafsson et al. |
| 2017/0235362 | A1 | 8/2017 | Thunstrom et al. |
| 2017/0316264 | A1 | 11/2017 | Gustafsson et al. |
| 2018/0018018 | A1 | 1/2018 | Klingstrom |
| 2018/0192058 | A1 * | 7/2018 | Chen ........................ G06T 9/00 |

* cited by examiner

Primary Examiner — Fernando Alcon
(74) Attorney, Agent, or Firm — Samuel Yamron (57) ABSTRACT

A system for providing an image on a display is disclosed. The system may include a scaler chip. The scaler chip may be configured to receive video data. The scaler chip may be configured to receive eye tracking data. The scaler chip may be configured to cause a display to present an image, where the image is based on the video data and the eye tracking data.

20 Claims, 6 Drawing Sheets

PROVIDING AN IMAGE WITH A SCALER CHIP IN DIRECT COMMUNICATION WITH AN EYE TRACKING DEVICE

BRIEF SUMMARY OF THE INVENTION

In one embodiment, a system for providing an image on a display is provided. The system may include a scaler chip. The scaler chip may be configured to receive video data. The scaler chip may be configured to receive eye tracking data. The scaler chip may be configured to cause a display to present an image, where the image is based on the video data and the eye tracking data.

In another embodiment, a non-transitory machine readable medium having instructions stored thereon for providing an image on a display is provided. The instructions may be executable by one or more processors on a scaler chip for performing a method. The method may include receiving, with the scaler chip, video data. The method may also include receiving, with the scaler chip, eye tracking data. The method may further include causing, with the scaler chip, a display to present an image, where the image is based on the video data and the eye tracking data.

In another embodiment, a method for providing an image on a display is provided. The method may include receiving, with a scaler chip, video data. The method may also include receiving, with a scaler chip, eye tracking data. The method may further include causing, with the scaler chip, a display to present an image, where the image is based on the video data and the eye tracking data.

BRIEF DESCRIPTION OF THE DRAWINGS

Embodiments of the present invention are described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability, or configuration of the disclosure. Rather, the ensuing description of the exemplary embodiments will provide those skilled in the art with an enabling description for implementing one or more exemplary embodiments. Persons of skill in the art will understand that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to any embodiment herein shall be an implicit recognition that such detail may affirmatively be intended not to be present.

Specific details are given in the following description to provide a thorough understanding of the embodiments. However, it will be understood by one of skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown or discussed without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to, transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents with the code segment or hardware circuit. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
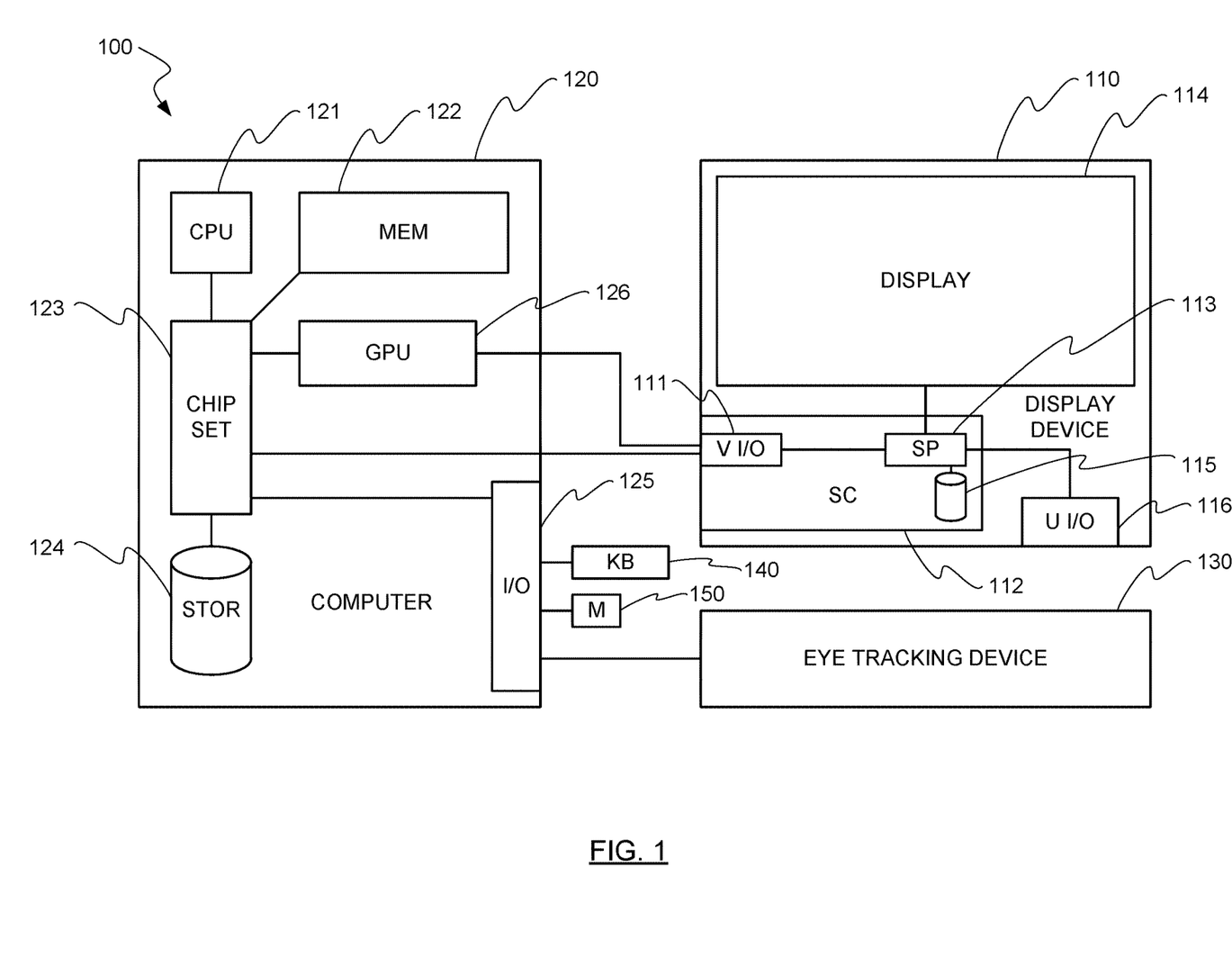
FIG. 1 is a block diagram of a system for modifying an original image for presentation on a display.

In an initial embodiment shown in FIG. 1, one potential system 100 for displaying an image on a display device 110 is provided. In this embodiment, a computer 120 is coupled with display device 110, as well as eye tracking device 130.

During normal user of system 100, computer 120 may cause images to be displayed on display device 110 as directed by the operating system (OS) and software executing on the central processing unit (CPU) 121 and memory 122 thereon. Chipset 123 may provide input and output capabilities to CPU 121 so that CPU 121 may recall operating systems and software from storage device 124; communicate with memory 122; receive inputs from, and provide outputs to users and/or other systems via input/output ports 125, such as keyboard 140 and mouse 150, as well as eye tracking device 130; as well as provide other functions.

Chipset 123 may also allow CPU 121 to direct images to be displayed on display device 110 via graphics processing unit (GPU) 126, or directly from integrated graphics processing available on some CPUs 121. The CPU, OS, and/or software running thereon, will direct GPU 126 or integrated graphics processing on CPU 121 to provide video data to display device 110.

The video data from the computer 120 is received by a video input/output port 111 of a scaler chip 112 of display device 110. In this embodiment, scaler chip 112, by way of scaler processor 113 and other components, has capabilities known in the art for converting video data into control signals for a display 114 which cause display 114 to show the image intended by the video data, thereby producing the result intended by computer 120. Video input/output port 111 may, merely by way of example, be a VGA port, a DVI port, an HDMI port, a DisplayPort port, a FireWire port, a USB port, and/or other video transmission ports known in the art. Video input/output port 111 could also be a proprietary port/video data transmission method.

In this embodiment, some of the capabilities of the scaler chip 112 include conversion of received video data into final pixel format for transmission to display 114, image processing of the same, insertion of on screen displays (logos, menu displays, picture-in-pictures, etc.), backlight control, and a discrete processor and memory device 115 to execute these functions. Scaler chip 112 may also communicate with user input/outputs 116 (for example, an on/off light, power switches, menu buttons) to execute typical user adjustment functions.

Though video input/output port 111 and memory device 115 are shown integrated with scaler chip 112, integration may also occur with a scaler board on which scaler chip 112 is integrated. Likewise, any other component discussed as part of the scaler chip 112 (or any other scaler chip referred to herein) may be integrated onto a scaler board including scaler chip 112. Scaler boards may be able to provide additional functionality, including a backlight driver and/or control/communication with other display device related peripherals (i.e., USB ports, webcams, etc.). In additional embodiments, scaler chip 112, and other scaler chips discussed herein may be more general chips and circuit boards having capabilities matching existing scaler chips and the improved scaler chips disclosed herein, as well as additional capabilities. The improved scalar chips disclosed herein may take advantage of any existing of future capability offered by scaler chips/boards, based on their ability to receive additional instructions/data from which action may be taken.

Some methods performed on system 100 may adjust the content displayed on display device 110 from the content as original directed to be produced by an application running on the OS of computer 120. By way of example, eye tracking data received from eye tracking device 130 may determine the eye tracking data based on observation of a user and thus the eye tracking data may indicate a gaze point of a user on display 114, perhaps by coordinates.

CPU 121, the OS, and/or other applications may modify an image produced by an application intended for production on display 114, based on the eye tracking data received from eye tracking device 130 (via input/output ports 125 and chipset 123), such that for a first area of the image, which includes a gaze point of a user on the image as determined from the eye tracking data, the image is presented in a first manner. The CUP 121, the OS, and other applications may also modify the image produced by the application, based on the eye tracking data received from eye tracking device 130 (via input/output ports 125 and chipset 123), such that for a second area of the image, which does not include the gaze point of the user on the image as determined from the eye tracking data, the image is presented in a second manner, where the second manner is different from the first manner.

Thus, a single video data stream which includes the modified image would be transmitted via GPU 126 or from an integrated graphics processor in CPU 121 via chipset 123 would be transmitted to video input/output port 111 of display device 110. Scaler chip 112 would then cause the modified image to be displayed on display 114, without substantial further modification, except what normally might be provided for all images scaler chip 112 processes (e.g., matching the overall image resolution to that of display 114, brightness, contrast, etc.). Thus, the image displayed by display 114 would be the image with a first area of that image presented in the first manner, and a second area of that image presented in the second manner. However, note that in this specific embodiment, the modification of the original image in this manner occurs via CPU 121, the OS running on CPU 121, and any applications also involved therewith.

In this manner, system 100 may provide a means to substantially mask portions of the image on display 114 where a user is not gazing, and leave substantially unmasked portions of the image on display 114 where the user is gazing. Thus, only the user will be able to recognize the overall contents of the image after gazing about the entire display over time. Consequently, substantially masked portions will be less decipherable to a viewer than substantially unmasked portions of the image. As described above, the modification of the original image in this manner occurs via CPU 121, the OS running on CPU 121, and any applications also involved therewith.

Thus, for example, the masked portion of the image could be presented using visual parameters which make the underlying content of the image less or un-decipherable to a viewer. Further to the example, a solid white, black, or other color could be overlaid onto the masked portion, while the unmasked portion could present the image in essentially unchanged form except for minor adjustment (i.e., color, brightness, contrast, hue, etc.). Other types of masking could involve blurring of the image; decreasing the brightness of the image; layover of dense patterns of pixels, including lines, curves, shapes, etc.; and any other graphical effect capable of obscuring the masked area.

U.S. Pat. Nos. 8,462,949, and 9,536,097 discuss several methods of changing a displayed image to mask/unmask portions of an image, which may also be employed by all embodiments of the instant invention. These patents are hereby incorporated by reference, for all purposes, as if fully set forth herein.

Figure 2A:
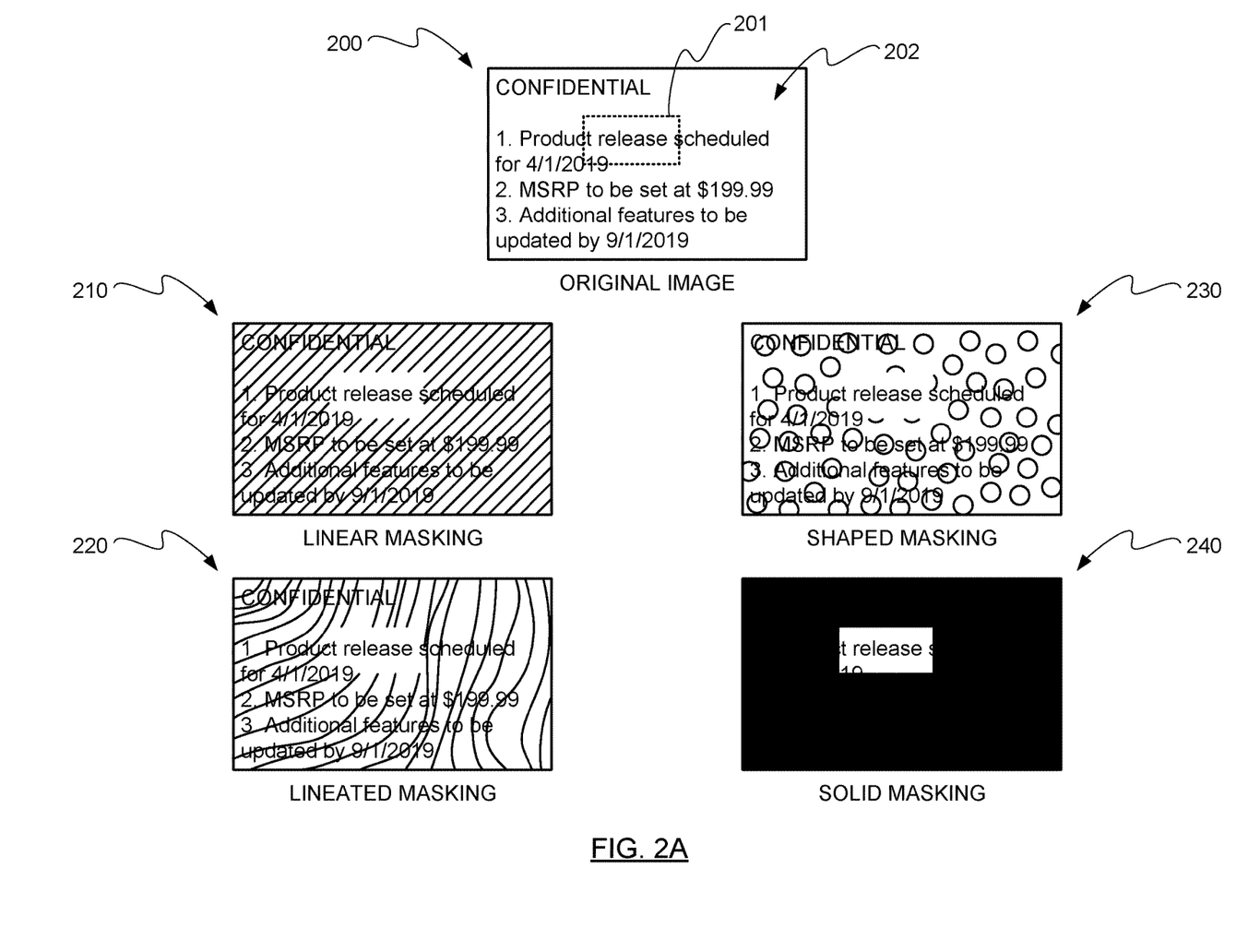
FIG. 2A shows an example original image and how embodiments of the invention might mask certain areas of the image for final display.

FIG. 2A shows four possible examples of how an original image 200 may be masked by embodiments herein. Other types of masking are possible. Original image 200 may be divided into a first area 201, and a remaining second area 202, based on the eye tracking data. The size and the shape of first area 201 may be predefined or dynamic as determined by the components/software herein, and centered around the gaze point of the user. In the initial embodiment, CPU 121, the OS, and/or other applications running on computer 120 may mask the remaining second area 202 to occur based on eye tracking data received from eye tracking device 130 as described herein. Masking may be linear as shown in the first example 210, lineated as shown in the second example 220, shaped as shown in the third example 230, and/or solid as shown in the fourth example. Any variation of these methods is also contemplated. In this manner, masking conceals the majority of content of the image from all individuals, and renders only a portion of the content of the image viewable, at the location where the user is viewing, and capable of changing.

In other embodiments, foveated rendering may be provided by this embodiment of the invention, where CPU 121, the OS running on CPU 121, and other applications associated therewith receive eye tracking data via input/output ports 125 and chipset 123, and modify an image based thereon. In this manner, the first area of display 114 where the user's gaze point is located is displayed in a first manner (e.g., a first resolution), and the second area of display 114 where the user's gaze point is not located is displayed in a second manner. For example, the second manner may be a second resolution, where the second resolution is lower than the first resolution, perhaps in a decreasing manner as distance from the first area increases (i.e., foveated rendering/resolution). As described above, the modification of the original image in this manner occurs via CPU 121, the OS running on CPU 121, and any applications also involved therewith.

U.S. Pat. No. 9,830,513 and U.S. Patent Publication Nos. 2017/0090563, 2017/0090564, 2017/0091549, 2017/0235362, 2017/0316264, and 2018/0018018 discuss several methods of foveated rending, which may also be employed by all embodiments of the instant invention. These patents and applications are hereby incorporated by reference, for all purposes, as if fully set forth herein. In particular, U.S. Patent Publication Nos. 2017/0235362 (see FIGS. 2, 3A, 3B, 4, 7A, 7B, 10, and 11, as well as the discussion thereof) and 2018/0018018 (see FIGS. 2-5, as well as the discussion thereof) describe a number of methods of modifying an image to provide foveated rendering, all of which may be practiced by any of the components discussed herein as conducting foveated rendering of different areas of an image.

Figure 2B:
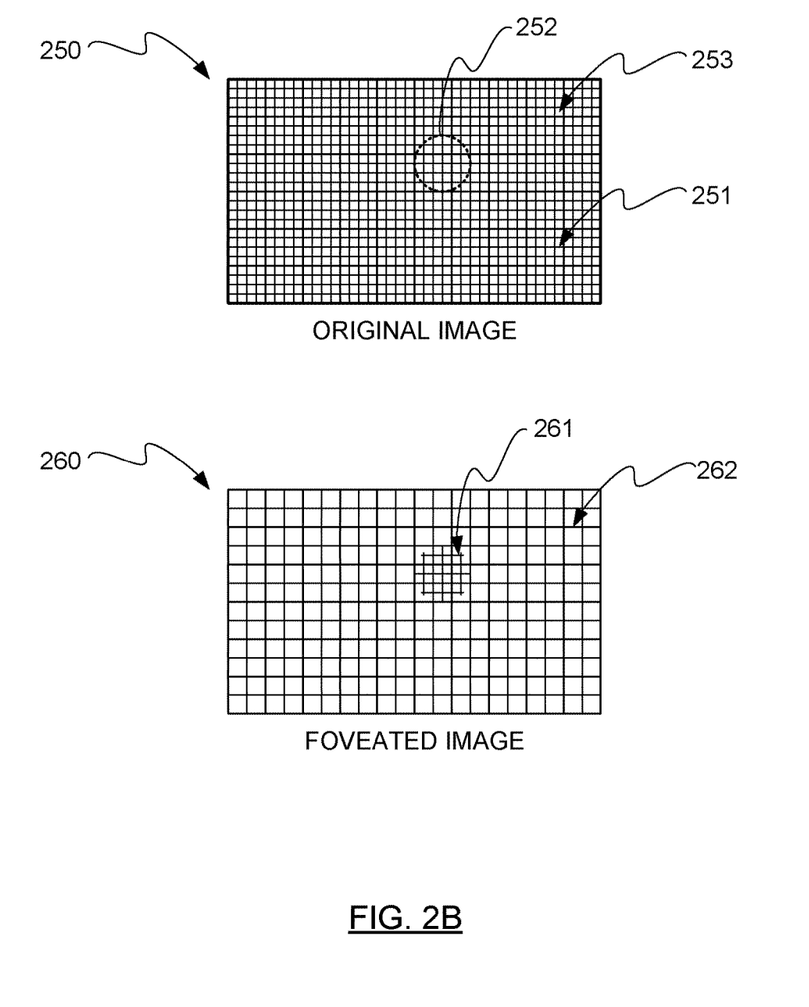
FIG. 2B shows an example original image and how embodiments of the invention might present the image using foveated rendering.

FIG. 2B shows an example of how an image might be presented using a foveated resolution. While other examples are presented in the above-referenced documents, in this example, an original image 250 is provided at a first resolution 251 as shown by the gridlines. A first area 252 includes where eye tracking data indicates a user is observing. A second area 253 includes the remaining area of the image. In the foveated image 260 the first resolution 261 of first area 252 is greater than the second resolution 262 of the second area 253. Other types of foveated resolution schemes are possible as discussed in at least the above-referenced documents.

Thus, the initial embodiment described above, contemplates one possible means of producing an image on display 114, where at least two different portions of the image are produced in different manners based on eye tracking data from eye tracking device 130, which may include, or from which may be determined, a gaze location of a user on display 114. Examples have been discussed in FIG. 2 of FIG. 3. However, other embodiments described below will modify certain aspects of the initial embodiment, and thereby result in improvements thereto. These improvements include lowering the processing and data-transmission loads on CPU 121, chipset 123, memory 122, GPU 126, storage device 124, and input/output ports 125.

Figure 3:
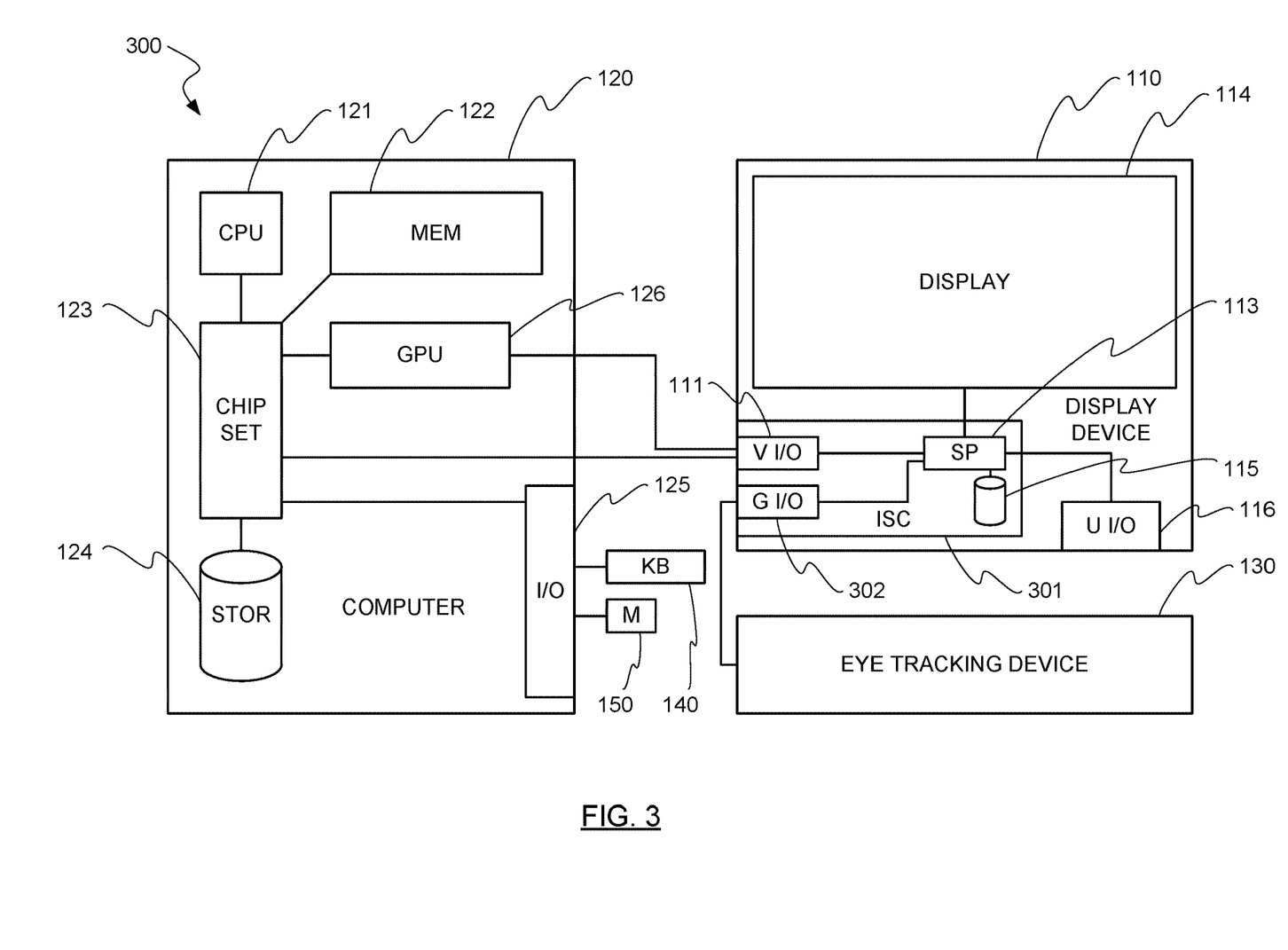
FIG. 3 is a block diagram of a system for modifying an image presented on a display using an improved scaler chip.

FIG. 3 shows an improved embodiment of the invention having a system 300 whereby an improved scaler chip 301 is provided. Improved scaler chip 301 includes a general input/output port 302 which is operable to receive eye tracking data directly from eye tracking device 130. In this manner, improved scaler chip 301 (via scaler processor 113) may implement masking and foveated rendering of an original image as received from computer 120 without assistance of computer 120 or the components thereof, and the OS and software thereon. General input/output port 302 may, merely by way of example, be a FireWire port, a USB port, and/or other data transmission port known in the art. General input/output port 301 could also be a proprietary port/data transmission method.

In some embodiments, instructions stored on memory device 115 may direct improved scaler chip 301 in determining the first area of the image (the area which includes the gaze point of the user) based on the eye tracking data received directly from eye tracking device 130, as well as the second area of the image (the area which does not include the gaze point of the user). Instructions stored on memory device 115 may also determine the size and the shape of the first area, whether predefined or dynamic. Instructions stored on memory device 115 may also define the characteristics of the masking or foveated rendering. In short, instructions previously executed in a likewise manner by CPU 121, memory 122, chipset 123, and/or GPU 126 to perform masking and/or foveated rendering are now executed by scaler chip 301 based on eye tracking data provided directly to scaler chip 301.

In some embodiments, the instructions stored on memory device 115 may have been received via general input/output port 302, either previous to or concurrently with, eye tracking data received from eye tracking device 130. In other embodiments, some or all of the instructions stored on memory device 115 may have been provided at the time of production. Memory device 115 may therefore consist of volatile or non-volatile memory based on the needs of the embodiment. A proprietary or non-proprietary instruction set (e.g., code, etc.) or proprietary or non-proprietary application programming interface (API) may be used to communicate with and instruct improved scaler chip 301. In this manner, any function of improved scaler chip 301 may be controlled via instructions received at general input/output port 302, and potentially stored at memory device 115.

In the above described manner, improved scaler chip 301 of display device 110 modifies the original image locally to provide the intended effects, compared to the embodiment shown in FIG. 1, which modifies the original image remotely at computer 120, thereby consuming valuable processing resources of computer 120 which could be used for other tasks. Additionally, the tasks of scaler processer 113 are common or only slightly varied between the two embodiments, as scaler processor 113 is performing the same or similar tasks as it did originally. Those tasks being modification of an original image received at video input/output port 111, but this time using additional instructions received at general input/output port 302 or stored on memory device 115. This decreases the processing and data-transmission loads on CPU 121, chipset 123, memory 122, GPU 126, storage device 124, and input/output ports 125, thereby increasing the performance of computer 120 in system 300 over computer 120 in system 100, while adding minimal additional processing/communication load to improved scaler chip 301.

Figure 4:
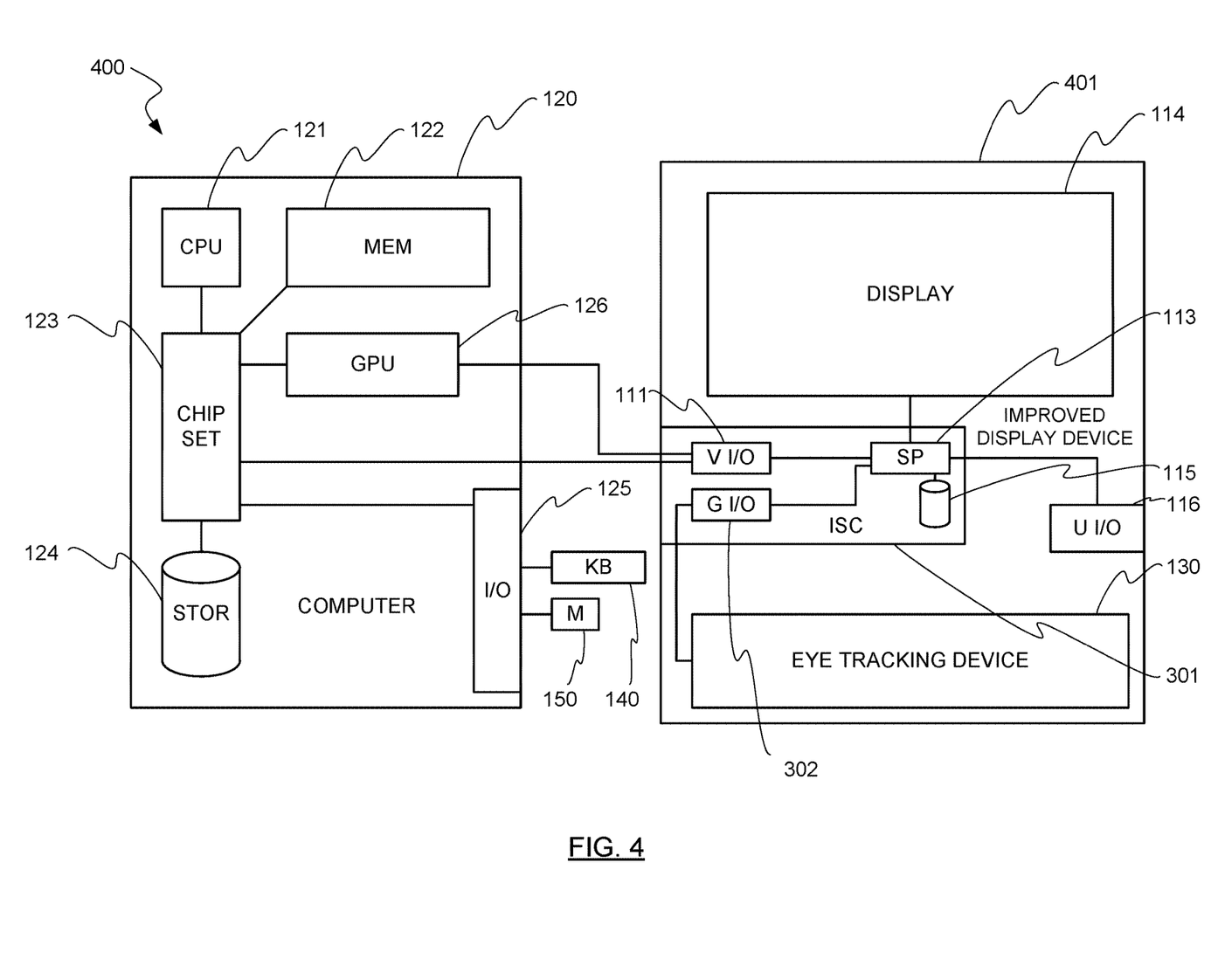
FIG. 4 is a block diagram of a system for modifying an original image for presentation on a display using an improved display device having an improved scaler chip.

In another embodiment, as shown in FIG. 4, system 400 may include eye tracking device 130 integrated within an improved display device 401 having improved scaler chip 301. System 400 may function substantially as described above, as will now be apparent to those of skill in the art.

Figure 5:
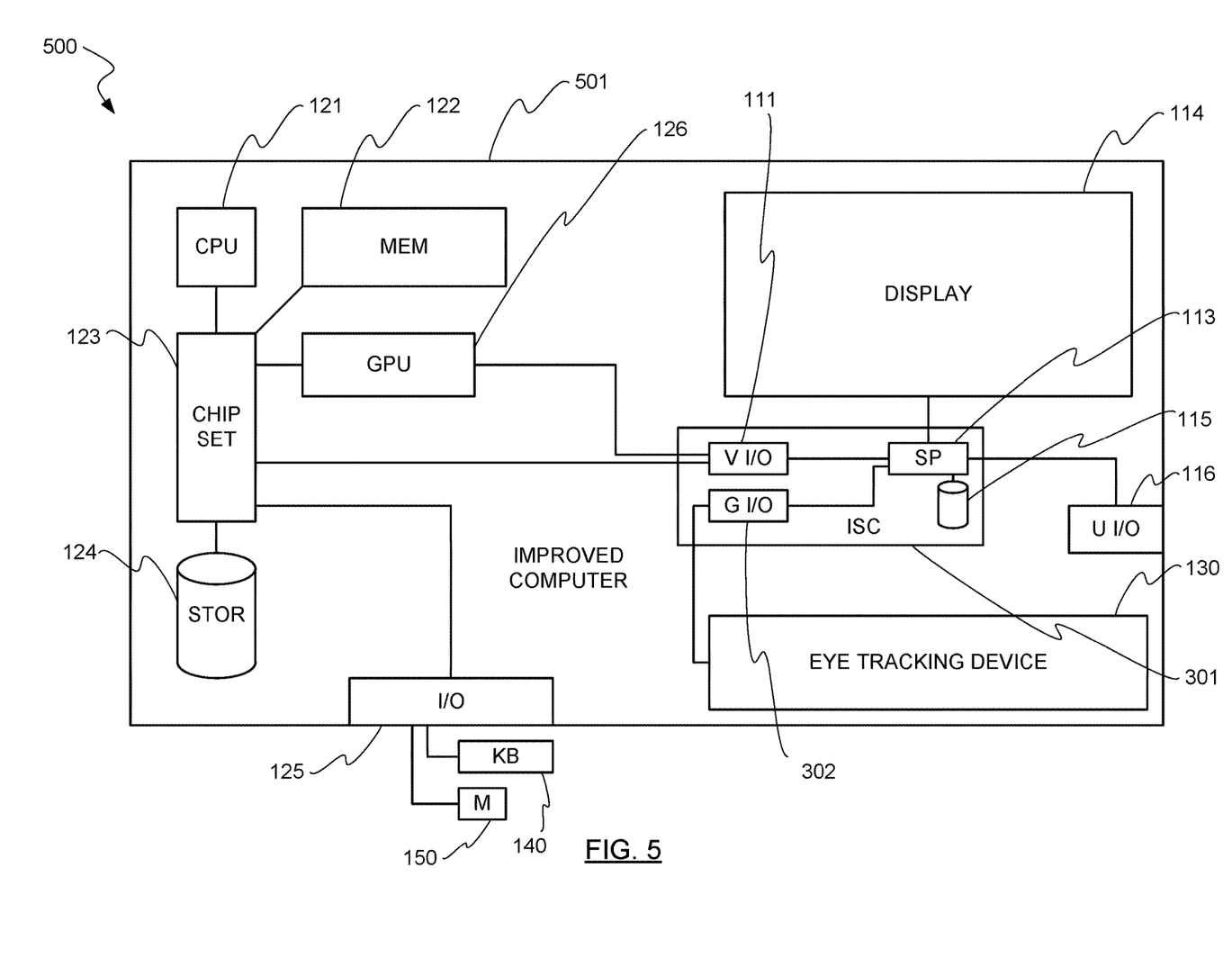
FIG. 5 is a block diagram of a system for modifying an original image for presentation on a display using an improved computer having an improved scaler chip.

In yet another embodiment, as shown in FIG. 5, system 500 may include the components of improved display device 401 integrated within improved computer 501 (an "all-in-one" computing device). However, in this embodiment, note that eye tracking data from eye tracking device 130 still is not transmitted to CPU 121, chipset 123, memory 122, the OS, and any applications running thereon, and instead is transmitted directly to improved scaler chip 301. System 500 may function substantially as described above, as will now be apparent to those of skill in the art. Note that in some embodiments, keyboard 140 may also be integrated with improved computer 501.

In other contemplated embodiments, employing system 100, eye tracking data may be passed through chipset 123, but not CPU 121, and hence not the OS or applications running thereon, and be included with or attached to video data sent by chipset 123 and/or GPU 126. In this manner, masking or foveated rendering is still accomplished via modification of the images in the video data by improved scaler chip 301. The Basic Input/Output System (BIOS) of computer 120 may assist in causing chipset to so route the eye tracking data without the assistance of CPU 121 and/or memory 122.

The invention has now been described in detail for the purposes of clarity and understanding. However, it will be appreciated that certain changes and modifications may be practiced within the scope of the appended claims.

What is claimed is:

1. A system for providing an image on a display, wherein the system comprises:
a scaler chip configured to:
receive video data;
receive eye tracking data directly from an eye tracking device through a general input/output port; and
cause a display to present an image without using assistance from an external computer hardware or software components, wherein the image is based on the video data and the eye tracking data; and
wherein the image being based on at least the video data and the eye tracking data comprises:
a first area of the image, which includes a gaze point of a user on the image as determined from the eye tracking data, being presented in a first manner; and
a second area of the image, which does not include the gaze point of the user on the image as determined from the eye tracking data, being presented in a second manner, wherein the second manner is different from the first manner; and
wherein the first manner comprises the video data substantially unmasked, such that the video data is decipherable to the user; and
the second manner comprises the video data substantially masked, such that the video data is substantially indecipherable.

2. The system for providing an image on a display of claim 1, wherein the system further comprises:
a display device comprising:
the scaler chip; and
the display.

3. The system for providing an image on a display of claim 2, wherein the system further comprises:
the eye tracking device configured to:
determine the eye tracking data based on observation of a user; and
send the eye tracking data to the scaler chip.

4. The system for providing an image on a display of claim 1, wherein the system further comprises:
a central processing unit, wherein the central processing unit does not receive the eye tracking data.

5. The system for providing an image on a display of claim 4, wherein the system further comprises:
a chipset configured to provide input and output capabilities to the central processing unit, wherein the chipset does not receive the eye tracking data.

6. The system for providing an image on a display of claim 1, wherein:
the first manner comprises the video data displayed using a first set of visual parameters; and
the second manner comprises the video data displayed using a second set of visual parameters, wherein the second set of visual parameters is different than the first set of visual parameters.

7. The system for providing an image on a display of claim 6, wherein:
the first set of visual parameters includes a first resolution; and
the second set of visual parameters includes a second resolution, wherein the second resolution is lower than the first resolution.

8. The system for providing an image on a display of claim 7, wherein the second resolution comprises:
a foveated resolution extending away from the first area of the image.

9. The system for providing an image on a display of claim 1, wherein the scaler chip being configured to receive video data comprises:
the scaler chip comprising a video input port.

10. The system for providing an image on a display of claim 1, wherein the scaler chip being configured to receive eye tracking data comprises:
the scaler chip comprising a general input port.

11. The system for providing an image on a display of claim 1, wherein the scaler chip being configured to cause the display to present the image comprises:
the scaler chip comprising a scaler processor.

12. The system for providing an image on a display of claim 1, wherein the scaler chip further comprises:
a general input port configured to receive instructions regarding how the image is to be based on the video data and the eye tracking data.

13. The system for providing an image on a display of claim 1, wherein the scaler chip further comprises:
a memory device storing instructions regarding how the image is to be based on the video data and the eye tracking data.

14. A non-transitory machine readable medium having instructions stored thereon for providing an image on a display, wherein the instructions are executable by one or more processors on a scaler chip for at least:
receiving, with the scaler chip:
video data; and eye tracking data directly from an eye tracking device through a general input/output port; and causing, with the scaler chip, a display to present an image without using assistance from an external computer hardware or software components, wherein the image is based on the video data and the eye tracking data; and wherein the image being based on at least the video data and the eye tracking data comprises:

a first area of the image, which includes a gaze point of a user on the image as determined from the eye tracking data, being presented in a first manner; and a second area of the image, which does not include the gaze point of the user on the image as determined from the eye tracking data, being presented in a second manner, wherein the second manner is different from the first manner; and wherein the first manner comprises the video data substantially unmasked, such that the video data is decipherable to the user; and the second manner comprises the video data substantially masked, such that the video data is substantially indecipherable.

15. The non-transitory machine readable medium having instructions stored thereon for providing an image on a display of claim 14, wherein the instructions are further executable by one or more processors on the scaler chip for at least:

receiving instructions, from a general input port of the scaler chip, regarding how the image is to be based on the video data and the eye tracking data.

16. The non-transitory machine readable medium having instructions stored thereon for providing an image on a display of claim 15, wherein the instructions are further executable by one or more processors on the scaler chip for at least:

receiving instructions, from a memory device of the scaler chip, regarding how the image is to be based on the video data and the eye tracking data.

17. A method for providing an image on a display, the method comprising:

receiving, with a scaler chip:
video data; and
eye tracking data directly from an eye tracking device through a general input/output port; and causing, with the scaler chip, a display to present an image without using assistance from an external computer hardware or software components, wherein the image is based on the video data and the eye tracking data; and wherein the image being based on at least the video data and the eye tracking data comprises:

a first area of the image, which includes a gaze point of a user on the image as determined from the eye tracking data, being presented in a first manner; and a second area of the image, which does not include the gaze point of the user on the image as determined from the eye tracking data, being presented in a second manner, wherein the second manner is different from the first manner; and wherein the first manner comprises the video data substantially unmasked, such that the video data is decipherable to the user; and the second manner comprises the video data substantially masked, such that the video data is substantially indecipherable.

18. The method for providing an image on a display of claim 17, further comprising:

determining, with the eye tracking device, the eye tracking data based on observation of a user; and sending, from the eye tracking device, the eye tracking data to the scaler chip.

19. The system for providing an image on a display of claim 1, wherein the video data that is substantially masked, is made substantially indecipherable by overlaying an indecipherable image over the masked portion of the video data.

20. The system for providing an image on a display of claim 1, wherein the video data that is substantially masked, is made substantially indecipherable by at least one of blurring, decreasing the brightness, overlaying a pattern of pixel on the masked portion of the video data.

* * * * *